Aug. 1, 1967 NOBUMITSU UNUMA 3,333,505
OPTICAL APPARATUS FOR OBTAINING SCHLIEREN PATTERNS
IN ROTATING CENTRIFUGE CELLS
Filed Feb. 3, 1964
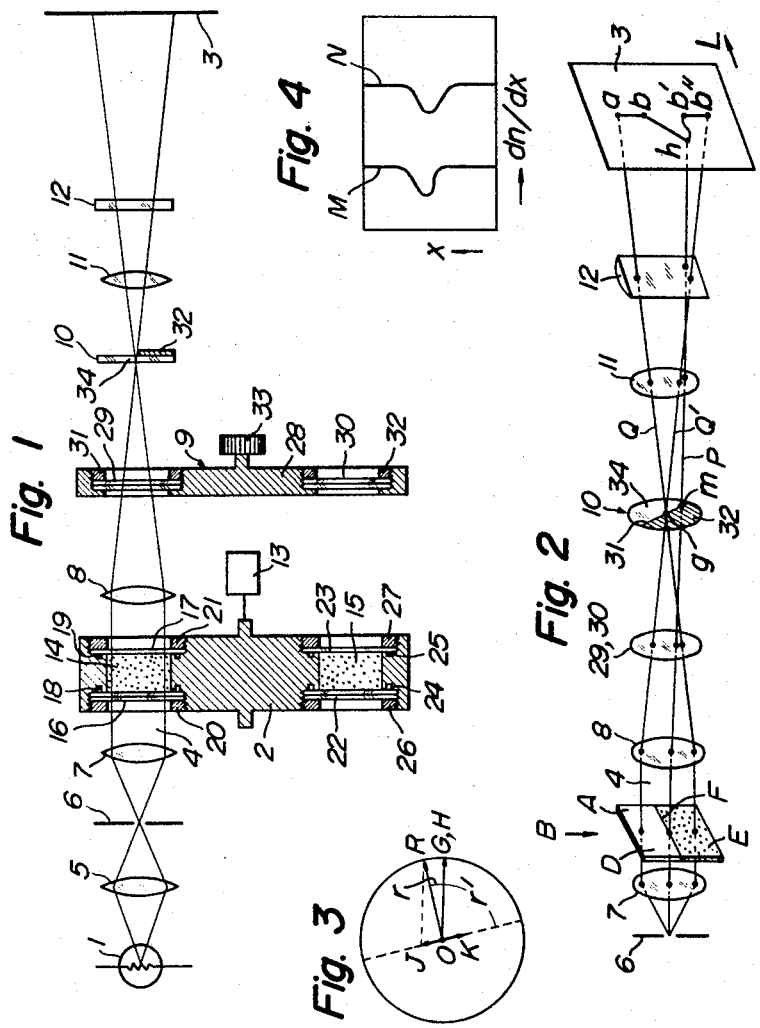
INVENTOR
NOBUMITSU UNUMA
BY: Paul M. Craig, Jr.
ATTORNEY United States Patent Office
3,333,505
Patented Aug. 1, 1967

3,333,505
OPTICAL APPARATUS FOR OBTAINING SCHLIEREN PATTERNS IN ROTATING CENTRIFUGE CELLS
Nobumitsu Unuma, Katsuta-shi, Japan, assignor to Hitachi, Ltd., Tokyo, Japan, a corporation of Japan
Filed Feb. 3, 1964, Ser. No. 342,009
1 Claim. (Cl. 88—14)

This invention relates to analytical ultracentrifuge and particularly to optical devices for use therein.

An analytical ultracentrifuge is an apparatus of determining molecular weights mainly of various high-molecular weight substances by subjecting their solutions to a large centrifugal force to cause a Schlieren effect and measuring the speed at which the Schlieren image moves by optical means to determine the sedimentation coefficient of the solute.

With such analytical ultracentrifuge, it has been much required in recent years to provide for simultaneous measurement of specimens of different substances for the purpose of minimizing the analyzing time and the time required in replacement of specimens. In order to meet this requirement, a previous analytical ultracentrifuge has included a highspeed rotor adapted to carry a plurality of specimens with respective filters arranged to transmit only light of particular wavelength differing from each other and a prism arranged behind the filters to focus Schlieren patterns of the respective specimens on a photographic plate or film. This arrangement, however, has involved a deficiency that the plurality of Schlieren patterns are hardly distinguishable since they are formed close to each other because of the limited dispersive power of the prism. This is particularly true in cases where the filters have transmissivity characteristics which are close to each other.

In view of the above, the present invention has for its object to provide an optical device for an analytical ultracentrifuge which is capable of forming Schlieren patterns of different specimens mounted on the rotor successively by mere translation of an image-receiving plate with proper spacings between the adjacent patterns to highly improve their observability.

The present invention will now be described in more detail with reference to the accompanying drawings, which illustrate one embodiment of the invention and in which:

FIG. 1 is a schematic illustration of an optical device for ultracentrifugal analysis embodying the invention;

FIG. 2 is a schematic diagram illustrating the principles of the device shown in FIG. 1;

FIG. 3 is a vector diagram of the light; and

FIG. 4 is a diagram illustrating the data obtained with the present optical device.

Referring to the drawings and first to FIGS. 1 and 2, reference numeral 1 indicates a source lamp; 2 a rotor adapted to rotate at high speed; 3 an image-receiving plate; and 4 the path of light. A condenser lens 5, a slit 6 and a collimating lens 7 are arranged in that order along that portion of the path of light 4 extending between the lamp 1 and rotor 2. Also, a viewing lens 8, a filter unit 9, a diagonal unit 10, a photographic camera lens 11 and a cylindrical lens 12 are arranged in that order along that portion of the path of light 4 extending between the rotor 2 and image-receiving plate 3. An electric motor 13 is connected with the rotor axially thereof for highspeed rotation thereof. The rotor 2 has formed therein cavities or cells 14 and 15 for holding specimen solutes. As shown, the cavities 14 and 15 are arranged diametrically opposite to each other on the same circle centered on the axis of rotation of the rotor 2 so as to pass across the path of light 4 when the rotor 2 is driven at high speed.

A filter 16 and a light-transmitting plate 17 are mounted in the specimen cavity 14 in spaced parallel relation to each other and the filter 16 transmits light of a particular wavelength only. Clamp rings 20 and 21 are used to hold the filter 16 and light-transmitting plate 17, respectively, in place with packing seals 18 and 19 interposed between the cavity wall and the filter 16 and plate 17, respectively. Another filter 22, which transmits only light of a particular wavelength differing from that of light allowed to pass through the filter 16, and another light-transmitting plate 23 are mounted in the cavity 15 in spaced parallel relation to each other and held in place by respective clamp rings 26 and 27 with packing seals 24 and 25 interposed between the cavity wall and the filter 22 and plate 23, respectively.

The filter unit 9 takes the form of a rotary disk 28 carrying filters 29 and 30, which are held in place by respective clamp rings 31 and 32, threaded in respective apertures formed in the disk. The filter 29 transmits only light of the same particular wavelength as that of the light allowed to pass through the filter 16 on the rotor and the filter 30 transmits only light of the same particular wavelength as that of the light allowed to pass through the filter 22. As illustrated, a finger grip 33 is formed on the rotary disk 28 at the center thereof. The filters 29 and 30 are obviously positioned on the rotary disk 28 diametrically opposite to each other on the same circle centered on the axis of rotation of the rotary disk 28 so as to pass across the path of light 4 upon rotation of the disk 28.

The diagonal unit 10 includes a circular base plate 34 which carries on its one side a wire 31 having a diameter, for example, of the order of 0.06 mm. and extending diametrally of the base plate at an angle to the horizontal. A layer 32, for example, of magnesium fluoride is coated over that section of the base plate 34 which extends beneath the wire 31.

In operation of the illustrated embodiment of the present invention, the filter unit 9 is rotated manually by means of the grip 33 to bring the filter 29 into the path of light 4 and the rotor 2 is driven by motor 13 at high speed so that the specimens held in the respective specimen cavities 14 and 15 are subjected to high centrifugal force to obtain Schlieren patterns. On the other hand, the lamp 1 when energized emits light which is converged by the condenser lens 5 to form a secondary light source at the slit 6. The light from the secondary source is formed into a parallel light beam by the collimating lens 7 and proceeds as such into the specimen cavities 14 and 15 in the fast rotating rotor 2. Since the specimen cavities are fitted with filters 16 and 22 transmitting only light of respective predetermined wavelengths only, as described above, each of the cavities 14 and 15 transmits only light of the predetermined wavelength intercepting light of any other wavelength. In the stage where no Schlieren effect is obtained in the specimens held in the respective cavities 14 and 15, the light transmitted through the cavities and passing through the filter 29 forms an image of the slit 6 at the center of the diagonal unit 10 under the effect of the viewing lens 8 and further proceeds through the camera lens 11 and cylindrical lens 12 to form a black image $a$–$b$–$b'$–$b''$ of the wire 31 of the diagonal unit 10 on the image-receiving plate 3, as shown in FIG. 2.

In this case, since the filter 29 characteristically transmits only light of a particular wavelength, which can pass through the filter 16, light of the particular wavelength allowed to pass through the specimen cavity 15 is intercepted by the filter 29 and only light of the particular wavelength allowed to pass through the specimen cavity 14 is allowed to reach the image-receiving plate 3.

As the rotor continues to rotate at high speed, the Schlieren effect comes to take place in the specimens held in the respective cavities 14 and 15. For better understanding of this process, description will now be made in detail with reference to FIG. 2. The specimens held in the cavities 14 and 15 are indicated by character A in FIG. 2 and the direction in which the centrifugal force acts by the arrow B. Characters D and E indicate those portions of the specimen which still remain free from any Schlieren effect and character F that portion in which the Schlieren effect has occurred. Assume that the light beam entering the specimen cavities 14 and 15 is uniform in intensity distribution and coherent throughout the entire cross section and that the light passing through the Schlieren-free portions D and E of the specimen A is represented by a vector OG in FIG. 3. The light OR passing through that portion F of the specimen in which the Schlieren effect has occurred is lagging in phase by an optical path length of $n(d'-d'')$ as compared with the light passing through the portions D and E through the light OR has the same intensity as the light OG. In the formula $n$ represents the refractive index of the specimen; $d'$ the optical path length of the light passing through portion F; and $d''$ that of the light passing through portions D and E, which are free from the Schlieren effect. As clearly shown in FIG. 3, the light passing through specimen portion F which is under the Schlieren effect is delayed in phase by $\gamma$ relative to the light OG passing through portions D and E which are free from the Schlieren effect. Vector OR can be decomposed into a component OH corresponding to vector OG and another component OJ. As will readily be understood, the component OH is identical with the light OG in phase as well as in magnitude and corresponds to the diffracted light of the zero order included in the light passing through the specimen portion F, which is under the Schlieren effect. Thus, lights OG and OH represent non-Schlieren light rays Q and Q'. The light component OJ corresponds to the primary and higher diffracted light included in the light passing through the specimen portion F and represents a Schlieren light P. The non-Schlieren light rays Q and Q' impinge upon the portion $g$ of the diagonal unit 10 and the Schlieren light P upon the portion $m$ thereof. On the other hand, that section of the base plate 34 in the diagonal unit 10 extending beneath wire 31 is coated with a layer 32 such as of magnesium fluoride $MgF_2$, as described hereinbefore, in a manner so that vector OK replacing OG and OH has the same magnitude as OJ and differs in phase therefrom by an angle of 180° (which corresponds to $\lambda/2$) or that OG and OH are advanced by an angle of $\gamma'$. Thus, OJ and OK interact to cancel each other and a black image is focused upon the image-receiving plate 3 by means of the camera lens 11 and cylindrical lens 12, as indicated by $h$ in FIG. 2. As a result, black images of the wire 31 on the diagonal unit 10 are focused on the image-receiving plate 3 as indicated by $a-b$ and $b'-b''$ in FIG. 2 by the light passing through the specimen portions D and E, free from the Schlieren effect and that portion of the light passing through the portion F with the Schlieren effect which corresponds to the diffracted light of the zero order, that is, by non-Schlieren light rays Q and Q'. Also, that portion of the light passing through the specimen portion F which corresponds to the primary and higher diffracted light, that is, Schlieren light P is focused on the image-receiving plate 3 to form a sharp black image of the wire 31 on the diagonal unit 10 as indicated by $b-h-b'$ under the effect of the coated layer 32. In this manner, a Schlieren pattern is obtained.

After the measurement of the specimen held in the cavity 14 has been completed, the grip 33 on the filter unit 9 is rotated through an angle of 180° to place the filter 30 in the path of light 4 while translating the image-receiving plate 3 by a predetermined distance in a horizontal direction indicated by the arrow L. In this case, since the filter 30 characteristically transmits only light of such a particular wavelength as may pass through filter 22, the light emitting through the filter 30 has at all times such a particular wavelength as allowed to pass through the specimen cavity 15. In quite the same manner as described above in connection with the measurement of the specimen held in the cavity 14, the light through the filter 30 is focused black on the image-receiving plate 3 as a Schlieren pattern of the specimen in the cavity 15. In FIG. 4, the ordinate represents the direction $x$ in which the Schlieren image is moved and the abscissa the gradient of refractive index, $dn/dx$, and characters M and N indicate Schlieren patterns obtained with the specimens held in the respective cells 14 and 15.

The lamp may conveniently take the form of an extra-high voltage mercury lamp but may also take the form of a xenon or any other lamp as long as it satisfies such basic conditions that it gives a spectrum of high intensity and that the wavelengths of the spectrum formed are extended in life primarily over the visible range. Though the filter unit 9 of the rotary type has been shown and described, other filter units such as of the horizontally reciprocable type may also be employed. In addition, the filter unit may be arranged forwardly of the rotor 2 instead of being arranged rearwardly thereof as illustrated. Also, it will be apparent that, though in the above embodiment the rotor 2 has two diametrically opposite specimen cells 14 and 15 for successive determination of two specimens, the rotor may also be formed with more than two specimen cavities for successive determination of a multiplicity of specimens. In this case, a filter unit is evidently needed which carries filters corresponding in number to the specimen cells. The diagonal unit 10 illustrated is a so-called phase plate, but may take the form of a diagonal bar, a diagonal slit or a diagonal screen, if desired. As the image-receiving plate 3, a photographic plate or film is conveniently employed which is movable horizontally. As noted, exchange of specimens can be performed with ease simply by removing and replacing the clamp rings 21 and 27 from the respective specimen cavities 14 and 15. The rotor formed with specimen cavities 14 and 15 has been shown and described only by way of example and, if desired, can be replaced by any other arrangement as long as it includes filters which transmit light only of respective predetermined wavelengths differing from each other.

It will be appreciated from the foregoing description that the optical device according to the present invention has various practical advantages in that Schlieren patterns can be obtained for different specimens simply by translating the image-receiving plate after the specimens have once been mounted and that the Schlieren patterns obtained in this mnaner are not arranged close to each other and can be observed with extreme ease.

What is claimed is:

An apparatus for obtaining Schlieren patterns in rotating centrifuge cells including a source lamp, a rotor having multiple specimen cavities therein, a replenishable image-receiving plate, a first optical arrangement disposed in the portion of the path of light extending between said lamp and said rotor for converting the light emitted from the source lamp into a parallel light beam to pass into a selected one of said specimen cavities and a second optical arrangement including a diagonal unit disposed in another portion of the path of light extending between said rotor and image-receiving plate for focusing on said image-receiving plate the Schlieren patterns of the specimens held in the respective specimen cavities in said rotor, said apparatus being characterized by a plurality of specimen cavities formed in said rotor along the same circle centered on the axis of rotation of said rotor so as to pass across the path of light, first filters mounted on said respective specimen cavities and adapted to transmit only light rays of a respective different wavelength characteristic of the specimen contained in the cavity on which a respective first filter is mounted, and a filter unit including a plurality of second filters each one being adapted to transmit only light rays of a respective different wavelength corresponding to a respective first-mentioned filter, said filter unit being adapted to bring any selected one of the second filters into the path of light whereby the Schlieren pattern of the specimen in a selected one of the specimen cavities may be obtained upon the combination of the selected specimen cavity and its associated respective first filter and the respective corresponding second filter all being disposed in optical alignment in the light path extending between the source lamp and the image receiving plate.

References Cited

UNITED STATES PATENTS 2,883,900   4/1959   Svensson _____ 88—14

JEWELL H. PEDERSEN, *Primary Examiner.*

B. LACOMIS, *Assistant Examiner.*